United States Patent [19]
Holdener et al.

[11] Patent Number: 6,144,506
[45] Date of Patent: Nov. 7, 2000

[54] BI-STABLE OPTICAL ACTUATOR

[75] Inventors: Fred R. Holdener, Tracy; Robert D. Boyd, Livermore, both of Calif.

[73] Assignee: The United States of America as represented by the United States Department of Energy, Washington, D.C.

[21] Appl. No.: 09/418,477

[22] Filed: Oct. 15, 1999

[51] Int. Cl.⁷ .................................................. G02B 7/02
[52] U.S. Cl. ........................ 359/812; 359/811; 359/813; 359/814; 359/817; 359/822; 359/827
[58] Field of Search .................... 359/812, 811, 359/813, 822, 814, 817, 827, 694, 821, 823; 353/76, 101; 350/255

[56] References Cited

U.S. PATENT DOCUMENTS

| | | | |
|---|---|---|---|
| 1,967,161 | 7/1934 | Simon | 353/76 |
| 3,675,559 | 7/1972 | Freeland | 95/44 C |
| 4,146,315 | 3/1979 | Pribich | 353/76 |
| 5,742,441 | 4/1998 | Grassens et al. | 359/822 |

*Primary Examiner*—Georgia Epps
*Assistant Examiner*—Tim Thompson
*Attorney, Agent, or Firm*—Randall W. C. Chang; William C. Daubenspeck; William R. Moser

[57] ABSTRACT

The present invention is a bi-stable optical actuator device that is depowered in both stable positions. A bearing is used to transfer motion and smoothly transition from one state to another. The optical actuator device may be maintained in a stable position either by gravity or a restraining device.

18 Claims, 3 Drawing Sheets

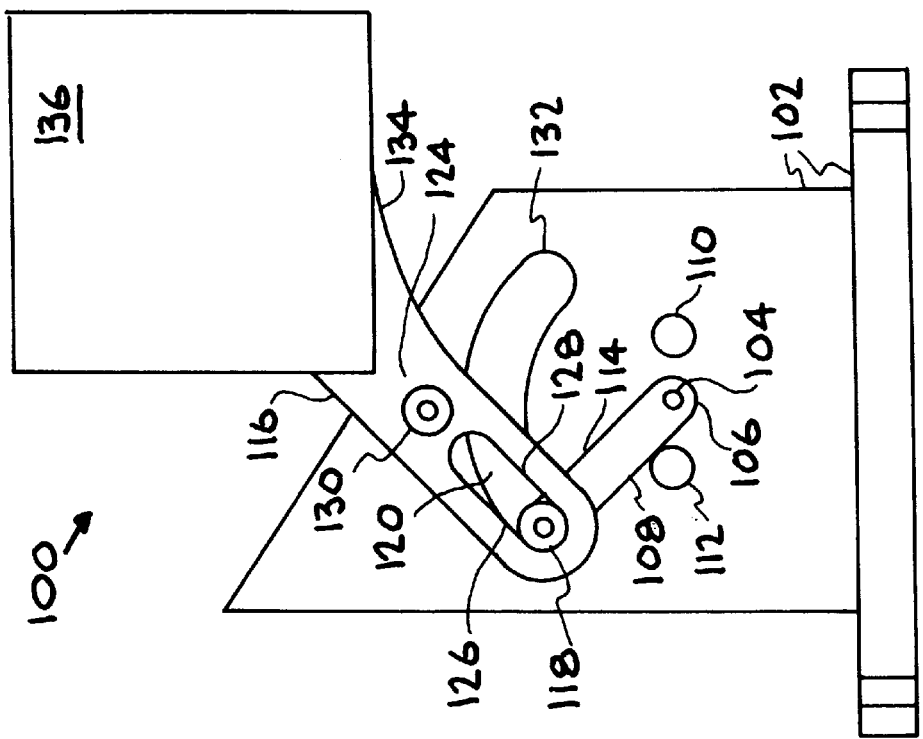
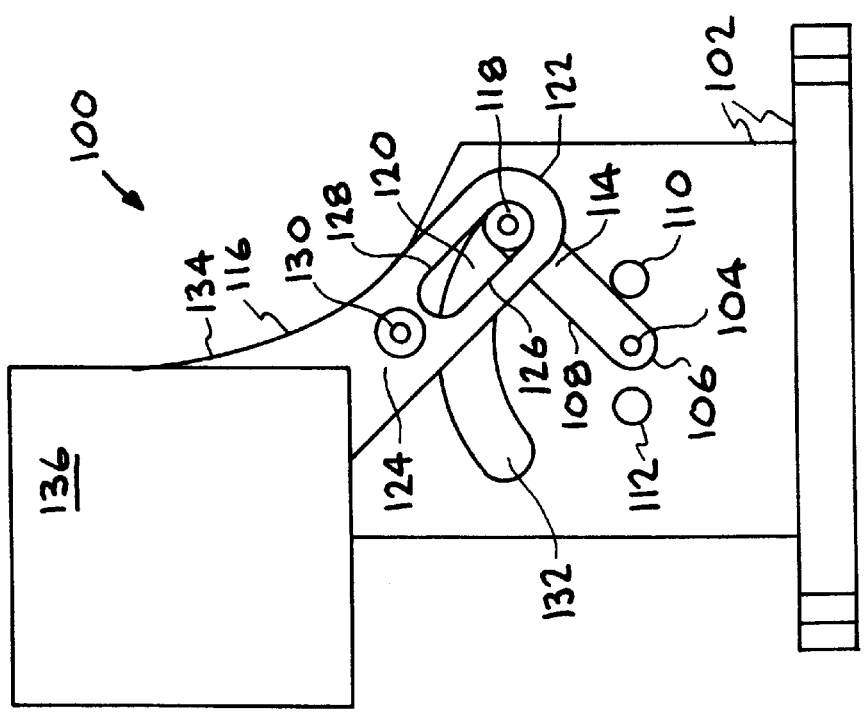

BI-STABLE OPTICAL ACTUATOR

STATEMENT OF GOVERNMENT INTEREST

The United States Government has rights in this invention pursuant to Contract No. W-7405-ENG-48 between the United States Department of Energy and the University of California for Management of the Lawrence livermore National laboratory.

BACKGROUND OF THE INVENTION

1. Field of the Invention

The present invention relates generally to optical actuators.

2. Description of the Prior Art

It is known in the art of bi-stable optical actuators to move an optical element into and out of a beam line. However, two-state devices that switch a component from a first stationary position to a second stationary position typically leave the power on while the component is stationed at one of the positions, or may depower one position and retain power in the second position. This overuse of power can cause unnecessary heat and wear to components as well as cause thermal air disturbances to the light beam being transmitted.

SUMMARY OF THE INVENTION

It is therefore an object of the present invention to provide a bi-stable optical device that does not require power to maintain the device in either of two stable positions.

According to one aspect of the present invention, there is provided an optical actuator device, comprising: a mounting base; an actuation arm having a first end, a second end, and a middle region, the middle region being rotatably connected to the mounting base, the first end including an elongated opening, the second end housing an optical element; a driver bar for driving the actuation arm between two stationary positions, the driver bar having a first end rotatably connected to the mounting base and a second end on which is mounted a bearing for engaging and traveling within the elongated opening, so that when the driver bar pivots in a given direction the actuation arm is driven in an opposite rotational direction by the bearing.

According to a second aspect of the present invention, there is provided an optical actuator device, comprising: a mounting base; an actuation arm having a first end, a second end, and a middle region, the middle region being rotatably connected to a mounting base, the first end including an elongated opening, the second end housing an optical element; a driver bar for driving the actuation arm between two stable positions, the driver bar having a first end rotatably connected to the mounting base and a second end on which is mounted a bearing for engaging and traveling within the elongated opening, so that when the driver bar pivots in a given direction the actuation arm is driven in an opposite rotational direction by the bearing; and a mechanical restraining means for holding the optical actuator in place when the optical actuator is in either of the two stable positions.

According to a third aspect of the present invention, there is provided a method for moving an optical element from a first stationary position to a second stationary position, comprising the steps of: moving an optical element from a first stable position to a second stable position; and maintaining the optical element in the second stable position by a non-powered means.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 1A is a front view in schematic form of a first embodiment of a bi-stable optical actuator device of the present invention showing the device in a first stable position;

FIG. 1B is a front view in schematic form of the optical actuator device of FIG. 1A showing the device in a second stable position;

DETAILED DESCRIPTION OF THE PREFERRED EMBODIMENT

Definitions

Figure 2B:
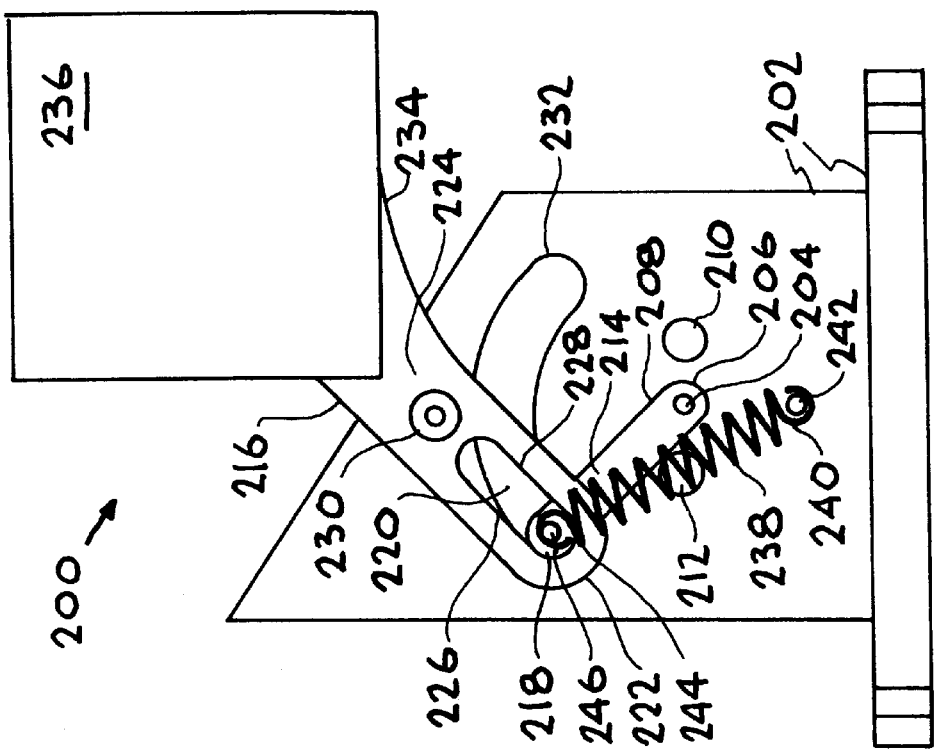
FIG. 2B is a front view in schematic form of the bi-stable optical actuator device of FIG. 2A showing the device in a second position.

For the purposes of the present invention the term "optical element" refers to a variety of elements that may be used in devices or with devices employing light beams or laser beams. Examples of typical optical elements include: a mirror, an absorbing glass, a polarization rotating element, a material with a cross hair marked thereon, etc. The optical element is generally attached to the actuation arm of the actuator device of the present invention by conventional means such as by mechanical adhesives, solders, fasteners, etc.

For the purposes of the present invention, the term "stable position" refers to a positioning of components of a bi-stable optical actuator device wherein the driver bar of the device is adjacent to and in contact with a stopper, no parts are in motion, and there is no power input into the device. The two types of stable positions differ in the force restraining the components from motion. A "stationary position" refers to a position wherein the driver bar is held in place by gravity alone. A "held position" refers to a stable position wherein the driver bar of the device is held in place by a mechanical restraining means, with no additional power input into the device.

For the purposes of the present invention, the term "mechanical restraining means" refers to a restraining means that does not actively require power to be effective in holding a driver bar in place. For the purposes of the present invention, suitable mechanical restraining means include: a spring attached to the driver bar, a pair of magnets, each of which is located at a stable position, that can hold in place a driver bar made of a ferromagnetic material, etc.

For the purposes of the present invention, the term "driving means" or "driving device" refers to an electric motor or other device that is capable of rotating an output rod that causes the driver bar to pivot. The driving device may preferably be an electric engine or rotary actuator. A preferred electric is part no. RA35A-2P12.9726 manufactured by Shindengen of Japan. Other types of electric engines may also be used with the optical actuator device of the present invention.

For the purposes of the present invention the term "power source" refers to a device or connection that supplies electric current, or other type of power, to the driving device for the actuator device. The power source may be alternating or direct current at a variety of strengths (voltages).

For the purposes of the present invention, the term "opposite rotational direction" refers to a simultaneous motion by the driver bar and the actuation arm, such that the end of the driver bar including the bearing and the end of the actuation arm including the elongated slot pivot along opposing arcs as shown in FIGS. 1A and 1B.

For the purposes of the present invention, the term "translational direction" refers to movements from the left towards the right, from the right towards the left, from the top towards the bottom, for from the bottom towards the top of a particular drawing figure.

For the purposes of the present invention, the term "non-regular configuration" refers to a configuration of the optical actuator device in a way other than the standard design of the device. In a regular configuration, the optical element of the bi-stable optical actuator device is oriented above the rest of the components, and all are the components arranged in a relatively vertical fashion. In a non-regular configuration, the bi-stable optical actuator device could be oriented horizontally or inverted.

Description

FIG. 1A illustrates one preferred embodiment of the present invention, in a first stationary position. A bi-stable optical actuator device 100 of the present invention is comprised of a mounting base 102 for supporting attached components of device 100. An output rod 104 transmits rotational force from a driving device (not shown in FIG. 1A) to a driven end 106 of a driver bar 108 through a fixed connection (not visible in FIG. 1A). Driver bar 108 has a restricted field of motion defined by a first stopper 110 and a second stopper 112. In the embodiment shown in FIG. 1A, first stopper 110 and second stopper 112 are limit switches. Driven end 106 of driver bar 108 rests against first stopper 110 when actuator device 100 is in a first stationary position, the position shown in FIG. 1A. Driven end 106 of driver bar 108 rests against second stopper 112 when actuator device 100 is in a second stationary position, shown in FIG. 1B.

A working end 114 of driver bar 108 is mechanically linked to an actuation arm 116 by a bearing 118 that slides within an elongated slot 120 in a driven end 122 of actuation arm 116. As driver bar 108 pivots from an the first stationary position shown in FIG. 1A, bearing 118 is forced to slide within elongated slot 120 toward a middle portion 124 of actuation arm 116. As bearing 118 slides within elongated slot 120, bearing 118 exerts a force on either a wall 126 or a wall 128 of slot 120, causing actuation arm 116 to pivot about a pivot 130. As bearing 118 moves from one side to the other of device 100, bearing 118 travels in a path defined by a curved outline 132 shown in schematic in FIG. 1A. As driven end 122 of actuation arm 116 is forced to move to the left by bearing 118, an optical element support end 134 of actuation arm 116 moves from the left, the position shown in FIG. 1A, to the right, the position shown in FIG. 1B. Conversely, as driven end 122 of actuation arm 116 is forced to move to the right by bearing 118, optical support end 134 moves from the right, the position shown in FIG. 1B, to the left, the position shown in FIG. 1A. Mounted on optical element support end 134 is an optical element 136. As optical element support end 134 moves from the position shown in FIG. 1A to the position shown in FIG. 1B optical element 136 not only moves from left to right in an arc, but also rotates 90° in a clockwise direction. Conversely, as optical element 136 moves from the position shown in FIG. 1B to the position shown in FIG. 1A, optical element 136 not only moves from right to left in an arc, but rotates 90° in a counterclockwise direction. Optical element 136 may be fixed to optical element support end 134, such as by soldering, by an adhesive, etc. or removably attached to optical support end 134 by conventional mechanical means such as screws, etc.

As shown in the embodiment of the present invention shown in FIGS. 1A and 1B, the driver bar and actuation arm are preferably at angle of 90° with respect to each other when the actuator device is in either of its two stable positions. Also, as can be seen in FIGS. 1A and 1B, pivoting the driver bar 90° causes the actuation arm to be pivoted 90° in the opposite rotational direction. By arranging the driver bar and actuation arm 90° to one another in both stationary positions, when the driver bar is activated, the actuation arm is accelerated by the driver arm and bearing from zero angular velocity at one of the stationary positions, to a maximum angular velocity at 45° of rotation and then decelerated back to zero velocity at 90° of rotation, when the driver bar and actuation arm reach the other stationary position. This design locks the actuation arm at either of the stationary positions until the actuator device is reversed.

Figure 2A:
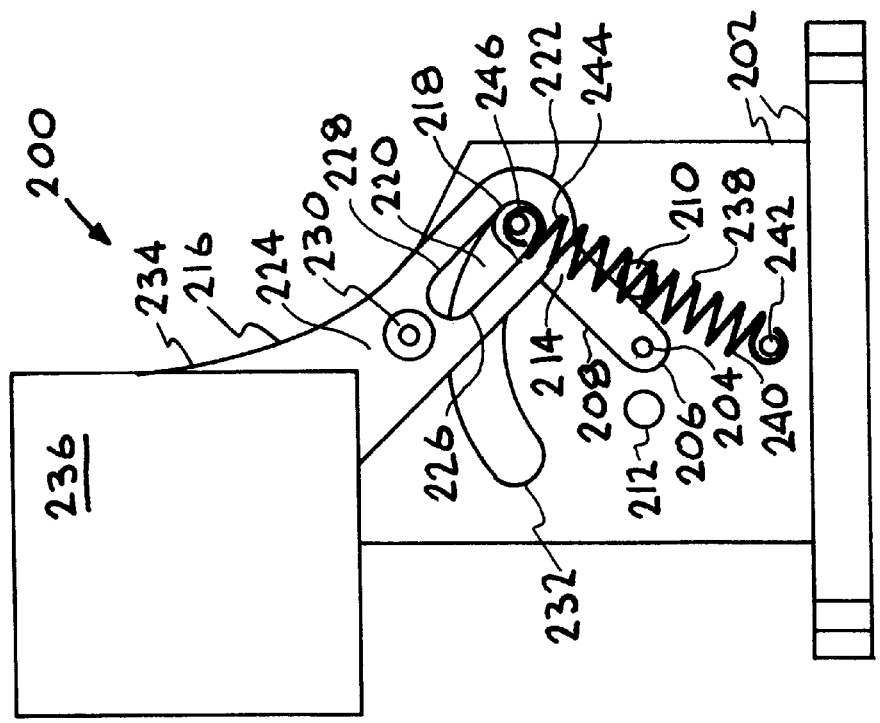
FIG. 2A is a front view in schematic form of a second embodiment of a bi-stable optical actuator device of the present invention showing the device in a first position.

FIG. 2A illustrates a second preferred embodiment of the present invention, in a first stationary position. A bi-stable optical actuator device 200 of the present invention is comprised of a mounting base 202 for supporting attached components of device 200. An output rod 204 transmits rotational force from a driving device (not shown in FIG. 2A) to a driven end 206 of a driver bar 208 through a fixed connection (not visible in FIG. 2A). Driver bar 208 has a restricted field of motion defined by a first stopper 210 and a second stopper 212. In the embodiment shown in FIG. 2A, first stopper 210 and second stopper 212 are limit switches. A working end 214 of driver bar 208 is mechanically linked to an actuation arm 216 by a bearing 218 that slides within an elongated slot 220 in a driven end 222 of actuation arm 216. As driver bar 208 pivots from an the first stationary position shown in FIG. 1, bearing 218 is forced to slide within elongated slot 220 toward a middle portion 224 of actuation arm 216. As bearing 218 slides within elongated slot 220, bearing 218 exerts a force on either a wall 226 or a wall 228 of slot 220, causing actuation arm 216 to pivot about a pivot 230. As bearing 218 moves from one side to the other of device 200, bearing 218 travels in a path defined by a curved outline 232 shown in schematic in FIG. 2A. As driven end 222 of actuation arm 216 is forced to move to move to the left by bearing 218, an optical element support end 234 of actuation arm 216 moves from the left, the position shown in FIG. 2A, to the right, the position shown in FIG. 2B. Conversely, as driven end 222 of actuation arm 216 is forced to move to the right by bearing 218, optical support end 234 moves from the right, the position shown in FIG. 2B, to the left, the position shown in FIG. 2A. Mounted on optical element support end 234 is an optical element 236. As optical element support end 234 moves from the position shown in FIG. 2A to the position shown in FIG. 2B, optical element 236 not only moves from left to right in an arc, but also rotates 90° in a clockwise direction. Conversely, as optical element 236 moves from the position shown in FIG. 2B to the position shown in FIG. 2A, optical element 236 not only moves from right to left in an arc, but rotates 90° in a counterclockwise direction. Optical element 236 may be fixed to optical element support end 234, such as by soldering, by an adhesive, etc. or removably attached to optical support end 234 by conventional mechanical means such as screws. etc.

The working end 214 of driver bar 208 is held against first stopper 210 by a spring 238 when actuator device 200 is in the first stable position, the position shown in FIG. 2A. A post end 240 of spring 238 is attached to a post 242 on mounting base 202 and a bar end 244 of spring 238 is attached to a post 246 on driver bar 208. Spring 238 also holds working end 214 of driver bar 208 against second stopper 210 when actuator device 200 is in the second stable position, shown in FIG. 2B.

The spring used to hold the driver bar in a stable position in the embodiment of the present invention shown in FIGS. 2A and 2B allows the actuator device to operate independently of gravity. Such an actuator device may be desirable when the actuator device is mounted upside down or at an angle such that gravity alone would not be sufficient to hold the driver bar in place at a stable position.

Figure 3:
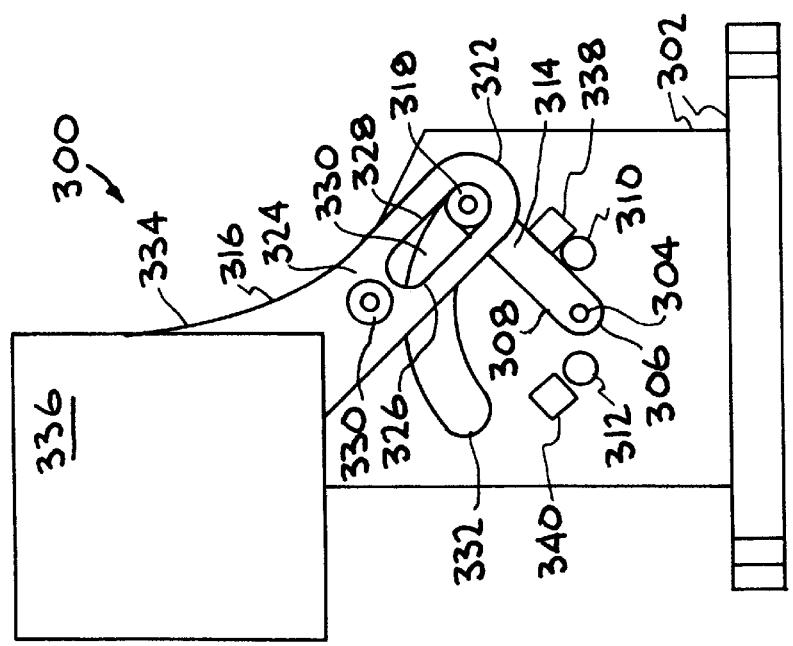
FIG. 3 is a front view in schematic form of a third embodiment of a bi-stable optical actuator device of the present invention showing the device in a first position.

FIG. 3 illustrates a third preferred embodiment of the present invention, in a first stationary position. A bi-stable optical actuator device 300 of the present invention is comprised of a mounting base 302 for supporting, attached components of device 300. An output rod 304 transmits rotational force from a driving device (not shown in FIG. 3) to a driven end 306 of a driver bar 308 through a fixed connection (not visible in FIG. 3). Driver bar 308 has a restricted field of motion defined by a first stopper 310 and a second stopper 312. In the embodiment shown in FIG. 3, first stopper 310 and second stopper 312 are limit switches. The working end 314 of driver bar 308 is mechanically linked to an actuation arm 316 by a bearing 318 that slides within an elongated slot 320 in a driven end 322 of actuation arm 316. As driver bar 308 pivots from the first stationary position shown in FIG. 1, bearing 318 is forced to slide within elongated slot 320 toward a middle portion 324 of actuation arm 316. As bearing 318 slides within elongated slot 320, bearing 318 exerts a force on either a wall 326 or a wall 328 of slot 320, causing actuation arm 316 to pivot about a pivot 330. As bearing 318 move from one side to the other of device 300, bearing 318 travels in a path defined by a curved outline 332 in schematic FIG. 3. As driven end 322 of actuation arm 316 is forced to move to move to the left by bearing 318, an optical element support end 334 of actuation arm 316 moves from the left, the position shown in FIG. 3, to the right (not shown). Conversely, as driven end 322 of actuation arm 316 is forced to move to the right by bearing 318, optical support end 334 moves from the right (not shown), to the left, the position shown in FIG. 3. Mounted on optical element support end 334 is an optical element 336. As optical element support end 334 moves in an arc from the position shown in FIG. 3 to the other stable position (not shown), optical element 336 not only moves from left to right in an arc, but also rotates 90° in a clockwise direction. Conversely, as optical element 336 moves from the other stable position (not shown) to the position shown in FIG. 3, optical clement 336 not only moves from right to left in an arc, but rotates 90° in a counterclockwise direction. Optical element 336 may be fixed to optical element support end 334, such as by soldering by an adhesive, etc. or removably attached to optical support end 334 by conventional mechanical means such as screws, etc.

In the embodiment shown in FIG. 3, driver bar 308 is made of a ferromagnetic material. In the stable position shown in FIG. 3, driven end 306 of driver bar 308 is held against first stopper 310 by a first magnet 338 mounted on mounting base 302. Similarly, driver bar 308 is held against the second stopper 312 by a second magnet 340 mounted on mounting base 302, when driver bar 308 is in the other stable position (not shown).

The magnets used to hold the driver bar in a stable position in the embodiment of the present invention shown in FIG. 3. Such an actuator device may be desirable when the actuator device is mounted upside down or at an angle such that gravity alone would not be sufficient to hold the driver bar in place at a stable position.

Figure 4:
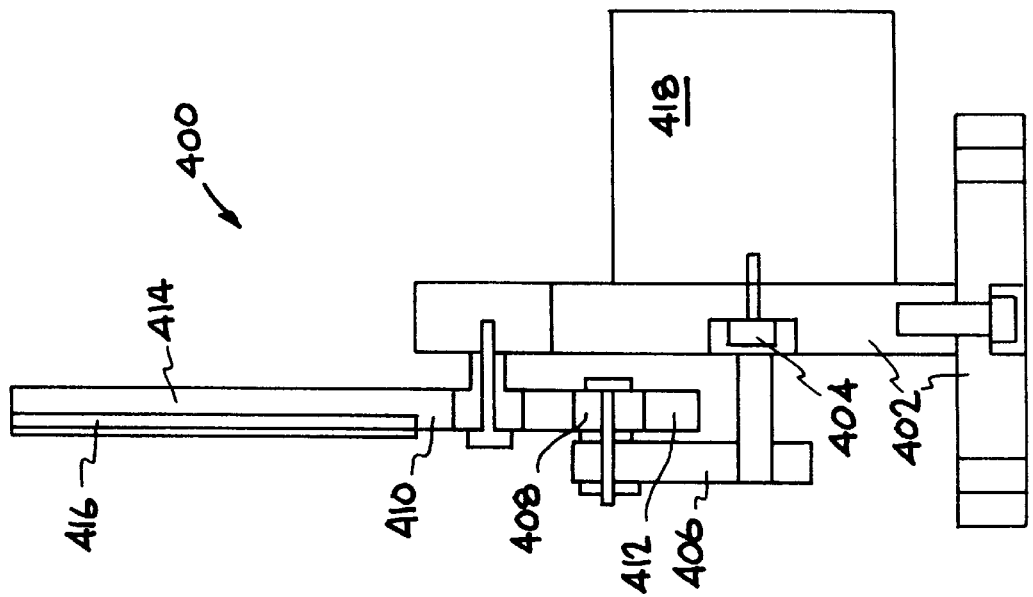
FIG. 4 is a side view in schematic form of a fourth embodiment of a bi-stable optical actuator device of the present invention.

FIG. 4 illustrates a side view of a fourth embodiment of the present invention. Components of a bi-stable optical actuator device 400 arc similar to those depicted in FIGS. 1A and 1B, notably a mounting base 402, an output rod 404, a driver bar 406, a bearing 408, an actuation arm 410 with a driven end 412 and a optical element support end 414, and an optical element 416.

FIG. 4 further depicts an electric motor 418 for driving driver bar 406 by means of output rod 404. Electric motor 418 is activated by the application of a short pulse of DC power. The direction that driver bar 406 is driven is determined by voltage polarity.

In the embodiment of FIG. 4 the driver bar is located a greater distance from mounting base than the actuation arm. For this reason, a resistance device, such as the spring depicted in FIGS. 2A and 2B would generally not be employed with the configuration of FIG. 4.

In general the mounting base of the present invention serves as a platform to which the components of the optical actuator device of the present invention are secured. The mounting base may be made of metal, or another sufficiently strong, non-deformable material.

The driver bar of the present invention is a component that is attached at one end to a driving device, such as an electric motor, for pivoting the driving bar and at another end to a bearing. The driver bar may be made of metal preferably aluminum.

The actuation arm of the present invention is the portion of the optical actuator device that is driven from the driver bar and pivots in an opposite rotational direction. The actuation arm may be made of a strong, non-deformable material. Preferably a machinable, high-strength plastic may be used in forming the actuation arm, such as DELRIN.

As shown in the embodiment of FIGS. 1A and 1B, the optical actuator device of the present invention may be designed to operate without restraining means while in a particular position due to the incorporation of a gravity vector in the design. In other embodiments of the present invention, the optical actuator device may employ a mechanical restraining means to provide a restraining force that restrains the motion of the device in a stable position. Examples of restraining means include: springs, magnets, etc.

The elongated opening of the present invention is a slot in the actuation arm that is shaped and sized to correspond to a bearing that moves within the slot. The elongated opening allows for sliding movement by the bearing on the driver bar. One end of the elongated opening is in contact with the bearing when the actuation arm is in either the first or second stable positions for the optical actuator device. The other end of the elongated opening may or may not be in contact with the bearing when the actuation arm is halfway between the first and second positions.

The bearing on the driving arm of the present invention is a conventional bearing. A preferred bearing is a roller bearing in which a shaft turns inside rollers arranged in a ring-like track. The bearing of the present invention preferably offers relatively low friction and will perform with smooth operation over a large number of cycles. The bearing may be made of metal, for example stainless steel.

The stoppers of the present invention are generally fixtures attached to the mounting base and projecting away from the base to a sufficient extent to contact the driver. The stoppers may be fixedly or removably attached, and may be made from a variety of non-deformable components. The stoppers prevent movement of the driver bar beyond the point where they are attached. An example of a pair of stoppers is a pair of limit switches.

When constructed according to the present invention, a bi-stable optical actuator device is a fast acting, repeatable device. It generates minimal heat because it is powered only in activation to change from a first to a second position. The electric motor used to power the device is preferably chosen for simplicity of operation. Any electric engine with the proper torque rating for the size of the device will work to operate the device as long as the actuator device is reversible. A stepper motor could be used after making slight modifications.

The optical actuator device of the present invention may be used in a variety of ways. For example, when the optical element is an absorbing glass, the optical actuator device may be used as optical shutters. When the optical element is a mirror, the device may be used as a beam insertion or beam sampling device. When the optical clement is a polarization rotating element, the device may function as a beam director. When the optical element is a special mask or cross hair, the device may function to insert an alignment centering reference to a beam line.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical actuator device, comprising:

a mounting base;

an actuation arm having a first end, a second end, and a middle region, said middle region being rotatably connected to said mounting base, said first end including an elongated opening, said second end housing an optical element;

a driver bar for driving said actuation arm between two stationary positions, said driver bar having a first end rotatably connected to said mounting base and a second end on which is mounted a bearing for engaging and traveling within said elongated opening, so that when said driver bar pivots in a given direction said actuation arm is driven in a opposite rotational direction by said bearing.

2. The device of claim 1, further comprising:

a first stopper means and a second stopper means between which said driver bar pivots, said driver bar resting against said first stopper means in one of said two stationary positions, and resting against said second stopper means in a second of said two stationary positions.

3. The device of claim 2, wherein:

wherein said driver bar and said actuation arm are at a relative angle of 90° with respect to each other when said actuator device is in either of said two stationary positions.

4. The device of claim 1, further comprising:

a driving means for driving said driver bar, said driving means being mounted on said mounting base.

5. The device of claim 4, further comprising:

a power source connected to said driving means for powering said driving means.

6. The device of claim 5, wherein:

said power source provides a pulse of DC power in the range of 3–30 volts.

7. An optical actuator device, comprising:

a mounting base;

an actuation arm having a first end, a second end, and a middle region, said middle region being rotatably connected to a mounting base, said first end including an elongated opening, said second end housing an optical element;

a driver bar for driving said actuation arm between two stable positions, said driver bar having a first end rotatably connected to said mounting base and a second end on which is mounted a bearing for engaging and traveling within said elongated opening, so that when said driver bar pivots in a given direction said actuation arm is driven in an opposite rotational direction by said bearing; and a mechanical restraining means for holding said optical actuator in place when said optical actuator is in either of said two stable positions.

8. The device of claim 7, further comprising:

a first and a second stopper means, between which said driver bar pivots, said driver bar is held against said first stopper means in one of said two stable positions, and held against said second stopper means in the other of said two stable positions.

9. The device of claim 8, wherein:

wherein said driver bar and said actuation arm are at a relative angle of 90° with respect to each other when said actuator device is in either of said two stationary positions.

10. The device of claim 7, wherein:

said mechanical restraining means comprises a spring.

11. The device of claim 10, wherein:

said spring is connected at a first end to said first end of said driver bar, and at a second end to said mounting base.

12. The device of claim 7, wherein:

said driver bar is comprised of a ferromagnetic material, and said mechanical restraining means comprises a first magnet and a second magnet mounted on said mounting base, said first magnet holding said driver bar in place when said driver bar is located at one of said two stable positions and said second magnet holding said driver bar in place when said driver bar is located at the other of said two stable positions.

13. The device of claim 7, further comprising:

a driving means for driving said driver bar, said driving means being mounted on said mounting base.

14. The device of claim 13, further comprising:

a power source connected to said driving means for powering said driving means.

15. The device of claim 14, wherein:
said power source provides a pulse of DC power in the range of 3–30 volts.

16. A method for moving an optical element from a first position to a second position, comprising the steps of:

applying rotational force to the first end of a driver bar, said first end being rotatably connected to a mounting base, which causes a bearing attached to the second end of said driver bar to slide within an elongated slot, resulting in said second end sweeping a first arc;

pivoting an actuation arm, having first and second ends, around a pivot point on said actuation arm, wherein said first end is mechanically linked by said bearing to said driver bar second end, wherein said pivoting is caused by said bearing sliding, wherein said actuation arm sweeps a second arc in a rotational direction opposite to said first arc, moving said optical element, which is attached to said actuation arm second end, from said first position to said second position as said actuation arm sweeps said second arc;

and holding said driver bar in a stable position by non-powered means after said driver bar has swept said first arc.

17. The method of claim 16, wherein said non-powered means is gravity.

18. The method of claim 16, wherein said non-powered means comprises a mechanical restraining means.

* * * * *